United States Patent
Kawasaki et al.

(10) Patent No.: US 7,919,553 B2
(45) Date of Patent: Apr. 5, 2011

(54) RUBBER COMPOSITION FOR BASE TREAD AND TIRE

(75) Inventors: Satoshi Kawasaki, Kobe (JP); Takayuki Hattori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/555,885

(22) Filed: Sep. 9, 2009

(65) Prior Publication Data

US 2010/0113663 A1    May 6, 2010

(30) Foreign Application Priority Data

Nov. 6, 2008  (JP) ................................ 2008-285678

(51) Int. Cl.
*C08K 5/04* (2006.01)
*C08K 5/00* (2006.01)
(52) U.S. Cl. ........................................ 524/394; 524/284
(58) Field of Classification Search .................... 524/394
See application file for complete search history.

(56) References Cited

FOREIGN PATENT DOCUMENTS

| | | | |
|---|---|---|---|
| JP | 2005-523967 A | | 8/2005 |
| JP | 2007-131730 A | | 5/2007 |
| JP | 2007131730 A | * | 5/2007 |
| JP | 2007-321041 A | | 12/2007 |
| JP | 2007321041 A | * | 12/2007 |
| WO | WO 03/091324 A1 | | 11/2003 |

OTHER PUBLICATIONS

Translation of JP2007321041, Dec. 2007.*
Translation of JP 2007131730, May 2007.*

* cited by examiner

*Primary Examiner* — Ling-Siu Choi
*Assistant Examiner* — Hui Chin
(74) *Attorney, Agent, or Firm* — Birch, Stewart, Kolasch & Birch, LLP

(57) ABSTRACT

The present invention aims to produce a rubber composition for a base tread, which suppresses reversion and achieves excellent mechanical strength, fuel economy and processability, and a tire using the rubber composition, with high efficiency to provide them to customers at low prices. The present invention relates to a rubber composition for a base tread, containing: a rubber component; and a mixture of a zinc salt of an aliphatic carboxylic acid and a zinc salt of an aromatic carboxylic acid, wherein the rubber component contains natural rubber and butadiene rubber, the butadiene rubber content being 10 to 90% by mass per 100% by mass of the rubber component, and the mixture of a zinc salt of an aliphatic carboxylic acid and a zinc salt of an aromatic carboxylic acid is contained in an amount of 1 to 10 parts by mass per 100 parts by mass of the rubber component.

5 Claims, No Drawings

RUBBER COMPOSITION FOR BASE TREAD AND TIRE

TECHNICAL FIELD

The present invention relates to a rubber composition for a base tread and a tire.

BACKGROUND ART

Tires for automobiles in these days are demanded to have various properties such as fuel economy, handling stability, abrasion resistance, and riding comfort. In order to improve those performances, a variety of innovations have been developed. For example, a two-layer structure of a tire tread consisting of a cap tread (surface layer) and a base tread (inner layer) has been known. Diene rubbers such as natural rubber and butadiene rubber are widely used as a rubber component of the base tread. However, when rubber compositions containing natural rubber and/or butadiene rubber are vulcanized with sulfur, a phenomenon of deteriorating the vulcanized rubber composition or of impairing the cross-linking, so-called reversion, may occur.

In these days, vulcanization for tire production has been often performed at a high temperature for a short time so as to improve the productivity of tires. In this case, the aforementioned phenomenon is especially significant. Furthermore, since reversion reduces the modulus and the hardness, the durability and handling stability of tires may be worsened and the tangent δ may be unnecessarily increased, leading to poor fuel economy.

Furthermore, in environmental point of view, like energy saving and tighter regulation on $CO_2$ emission control, an increasing attention has been paid to development of tires with low fuel consumption and there is an urgent need to improve fuel economy. Accordingly, there has also been a demand for a base tread that achieves lower fuel consumption. In order to obtain a tire with low fuel consumption, it is desirable to use a rubber composition with low heat build-up property. Known as a technique for achieving the low heat build-up property is reduction of carbon black in a rubber composition. However, since reduction of carbon black lowers the modulus and the hardness, the aforementioned problems occur.

Patent document 1 discloses a rubber composition containing a mixture of an aliphatic carboxylic acid and a zinc salt of an aromatic carboxylic acid, a silica with a certain specific surface area and a silane coupling agent, each in a predetermined amount. The rubber composition can improve rolling resistance performance, processability, abrasion resistance, and wet-skid resistance while suppressing reversion. Patent document 2 discloses a rubber composition which contains a carbon black with predetermined characteristic values and sulfur, and can improve low heat build-up property, chip/chunk resistance, and abrasion resistance in a balanced manner.

However, there is still room for improvement to achieve suppression of reversion, excellent durability and low fuel consumption in a balanced manner. Moreover, application to a base tread is not examined in detail.

Patent document 1: JP-A 2007-321041
Patent document 2: JP-A 2007-131730

SUMMARY OF THE INVENTION

The present invention aims to solve the problems mentioned earlier and to provide a rubber composition for a base tread which suppresses reversion, has excellent mechanical strength, and achieves good fuel economy and good processability. The present invention also aims to provide a tire produced using the rubber composition. Moreover, the present invention aims to produce the rubber composition and the tire with higher production efficiency so as to provide them to consumers at lower prices.

The present invention relates to a rubber composition for a base tread, containing: a rubber component; and a mixture of a zinc salt of an aliphatic carboxylic acid and a zinc salt of an aromatic carboxylic acid, wherein the rubber component contains natural rubber and butadiene rubber, the butadiene rubber content being 10 to 90% by mass relative to 100% by mass of the rubber component, and the mixture of a zinc salt of an aliphatic carboxylic acid and a zinc salt of an aromatic carboxylic acid is contained in an amount of 1 to 10 parts by mass relative to 100 parts by mass of the rubber component.

The present invention also relates to a tire having a base tread that is produced using the aforementioned rubber composition for a base tread.

The rubber composition for a base tread according to the present invention contains both of natural rubber and butadiene rubber as a rubber component and also contains a predetermined amount of a mixture of a zinc salt of an aliphatic carboxylic acid and a zinc salt of an aromatic carboxylic acid. As a result, the rubber composition can not only suppress reversion but have excellent durability as well. Moreover, the rubber composition can achieve excellent processability and fuel economy.

BEST MODE FOR CARRYING OUT THE INVENTION

The rubber composition for a base tread according to the present invention contains predetermined amounts of natural rubber and butadiene rubber as a rubber component and also contains a predetermined amount of a mixture of a zinc salt of an aliphatic carboxylic acid and a zinc salt of an aromatic carboxylic acid. Use of the rubber component and the mixture suppresses reversion and thereby reduces deterioration of the vulcanized rubber composition or impairment of the cross-linking state. As a result, the base tread to be obtained can be provided with excellent durability and handling stability.

Moreover, use of the rubber component and the mixture can produce a tire that can not only maintain excellent mechanical strength but can achieve good fuel economy as well. Further, the unvulcanized rubber composition to be obtained can have good processability. Since reversion can be suppressed, it is possible to prevent reduction of the mechanical strength such as modulus or increase of the tangent δ even in the case where vulcanization is performed at a high temperature for a short time. Accordingly, it is possible to improve the productivity while maintaining the durability and low fuel consumption.

The rubber composition according to the present invention contains both of natural rubber (NR) and butadiene rubber (BR) as a rubber component so as to have good grip when the tread portion is worn down, and have good durability and favorable rolling resistance performance.

The NR is not particularly limited, and those natural rubbers generally used in the tire industry, such as SIR 20, RSS #3 and TSR 20, may be used. Examples of the BR include butadiene rubbers having high cis-contents, butadiene rubbers having low cis-contents, and linear type butadiene rubbers with lower degrees of branching in the molecular structure. BRs having high cis-contents are preferably used.

In the rubber composition for a base tread, the NR content in 100% by mass of the rubber component is preferably 10% by mass or more, more preferably 20% by mass or more, and still more preferably 25% by mass or more. When the NR content is less than 10% by mass, the mechanical strength tends to be reduced. The NR content in 100% by mass of the rubber component is preferably 90% by mass or less, more preferably 80% by mass or less, and still more preferably 70% by mass or less. When the NR content is more than 90% by mass, the abrasion resistance tends to be reduced.

In the rubber composition for a base tread, the BR content in 100% by mass of the rubber component is 10% by mass or more, preferably 20% by mass or more, and more preferably 25% by mass or more. The BR content of less than 10% by mass tends to reduce the resistance to reversion, thereby deteriorating the mechanical strength as well as the durability and handling stability of the tire to be produced. The BR content in 100% by mass of the rubber component is 90% by mass or less, preferably 80% by mass or less, and more preferably 70% by mass or less. When the BR content is more than 90% by mass, the processability and the rolling resistance performance tend to be worse.

When the NR and the BR are used together in the rubber composition for a base tread, the total content of the NR and the BR in 100% by mass of the rubber component is preferably 70% by mass or more. When the total content is arranged to be 70% by mass or more, it is possible to achieve excellent durability and larger resistance to reversion. The total content of the NR and the BR in 100% by mass of the rubber component is more preferably 80% by mass or more, still more preferably 90% by mass or more, and most preferably 100% by mass.

In the rubber composition according to the present invention, there is no limitation on another rubber component which can be used together with the NR and BR. Examples of such another rubber component include epoxidized natural rubber (ENR), styrene-butadiene rubber (SBR), isoprene rubber (IR), butyl rubber (IIR), halogenated butyl rubber (X-IIR), chloroprene rubber (CR), ethylene-propylene-diene rubber (EPDM), and halogenated copolymers of an isomonoolefin and a para-alkylstyrene. Each of these may be used solely, or two or more of these may be used in combination.

With regard to the zinc salt of an aliphatic carboxylic acid in the aforementioned mixture, examples of the aliphatic carboxylic acid include: aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like materials. The vegetable oil-derived aliphatic carboxylic acids are desirable because they are environment-friendly, and it is possible to prepare for a future decrease in oil supply and to suppress reversion sufficiently. The aliphatic carboxylic acid derived from coconut oil, palm kernel oil, or palm oil is more desirable.

The carbon number of the aliphatic carboxylic acid is desirably 4 or more, and more desirably 6 or more. When the carbon number of the aliphatic carboxylic acid is less than 4, the dispersibility tends to deteriorate. The carbon number of the aliphatic carboxylic acid is desirably 16 or less, more desirably 14 or less, and still more desirably 12 or less. When the carbon number of the aliphatic carboxylic acid is more than 16, reversion tends not to be sufficiently suppressed.

The aliphatic group in the aliphatic carboxylic acid may be one having a chain structure, such as an alkyl group, or one having a ring structure, such as a cycloalkyl group.

With regard to the zinc salt of an aromatic carboxylic acid in the aforementioned mixture, examples of the aromatic carboxylic acid include benzoic acid, phthalic acid, mellitic acid, hemimellitic acid, trimellitic acid, diphenic acid, toluic acid, and naphthoic acid. In view of sufficient suppression of reversion, benzoic acid, phthalic acid, or naphthoic acid is desirable.

The content ratio of the zinc salt of the aliphatic carboxylic acid and the zinc salt of the aromatic carboxylic acid in the mixture [molar ratio: (zinc salt of aliphatic carboxylic acid)/(zinc salt of aromatic carboxylic acid), hereinafter referred to as "the content ratio"] is desirably 1/20 or more, more desirably 1/15 or more, and still more desirably 1/10 or more. When the content ratio is less than 1/20, it may be impossible to be environment-friendly and to prepare for a future decrease in oil supply, and further, the dispersibility and stability of the mixture tend to deteriorate. The content ratio is desirably 20/1 or less, more desirably 15/1 or less, and still more desirably 10/1 or less. When the content ratio is more than 20/1, suppression of reversion tends to be insufficient.

The zinc content in the mixture is desirably 3% by mass or more, and more desirably 5% by mass or more. When the zinc content in the mixture is less than 3% by mass, suppression of reversion tends to be insufficient. The zinc content in the mixture is desirably 30% by mass or less, and more desirably 25% by mass or less. When the zinc content in the mixture is more than 30% by mass, the processability tends to deteriorate and the cost may be increased unnecessarily.

The amount of the mixture to be blended is 1 part by mass or more, preferably 2 parts by mass or more, and more preferably 3 parts by mass or more, relative to 100 parts by mass of the rubber component. When the amount of the mixture is less than 1 part by mass, it may be impossible to assuredly achieve sufficient resistance to reversion, so that it is difficult to improve the durability. The amount of the mixture is 10 parts by mass or less, preferably 8 parts by mass or less, and more preferably 5 parts by mass or less, relative to 100 parts by mass of the rubber component. When the amount of the mixture exceeds 10 parts by mass, the viscosity of the rubber composition may be undesirably decreased, resulting in poor processability and in blooming.

Fatty acids, such as a stearic acid, a palmitic acid, a myristic acid, a lauric acid, a caprylic acid, an oleic acid, and a linoleic acid, may be blended in the rubber composition of the present invention. A stearic acid is desirable among them because it is low in cost.

In addition to the rubber component, the mixture of the zinc salt of the aliphatic carboxylic acid and the zinc salt of the aromatic carboxylic acid, and the fatty acid, the rubber composition of the present invention may contain compounding ingredients conventionally used in the rubber industry, such as fillers including carbon black and silica, silane coupling agents, oils or plasticizers, waxes, antioxidants, antiozonants, age resistors, auxiliary vulcanization accelerators, zinc oxide, peroxides, vulcanizing agents including sulfur and sulfur-containing compounds, and vulcanization accelerators.

Non-limiting examples of the carbon black usable in the rubber composition of the present invention include HAF, ISAF and SAF.

The carbon black preferably has an average particle size of 35 nm or less and/or has a DBP oil absorption of 70 ml/100 g or more. When the viscosity of the unvulcanized rubber composition is too low, it is hard to handle it, and further, molded bodies to be obtained may too easily adhere to one another, resulting in poor moldability and reduced workability. In such a case, by using the carbon black having the aforementioned characteristics together with the mixture of the zinc salt of the aliphatic carboxylic acid and the zinc salt of the aromatic carboxylic acid, the viscosity of the unvulcanized rubber composition can be increased and thus the processability can be improved. Moreover, by blending the carbon black of this kind, it is possible to assuredly achieve sufficient block rigidity, partial abrasion resistance, abrasion resistance, and durability.

When the average particle size of the carbon black exceeds 35 nm, desirable breaking properties tend not to be obtained. The average particle size of the carbon black is more preferably 33 nm or less, and still more preferably 32 nm or less. The average particle size thereof is preferably 10 nm or more, and more preferably 11 nm or more. When the average particle size is less than 10 nm, the tan δ of the rubber composition tends to be high, leading to failure to achieve good fuel economy.

The average particle size according to the present invention is the number average particle size, and is measured by a transmission electron microscope.

When the DBP oil absorption of the carbon black is less than 70 ml/100 g, the tan δ of the rubber composition tends to be high, leading to failure to achieve good fuel economy. The DBP oil absorption of the carbon black is more preferably 80 ml/100 g or more, and still more preferably 90 ml/100 g or more. The DBP oil absorption thereof is preferably 150 ml/100 g or less, and more preferably 130 ml/100 g or less. When the DBP oil absorption exceeds 150 ml/100 g, desirable breaking properties tend not to be obtained.

The nitrogen adsorption specific surface area ($N_2SA$) of the carbon black is preferably 70 $m^2/g$ or more, more preferably 75 $m^2/g$ or more, and still more preferably 80 $m^2/g$ or more. When the nitrogen adsorption specific surface area is less than 70 $m^2/g$, rubber reinforcement tends to be reduced, resulting in poor durability. The $N_2SA$ of the carbon black is preferably 160 $m^2/g$ or less, more preferably 150 $m^2/g$ or less, and still more preferably 140 $m^2/g$ or less. When the $N_2SA$ exceeds 160 $m^2/g$, the rubber composition after vulcanization tends to be inferior in terms of the low heat build-up property, leading to poor fuel economy.

The amount of the carbon black to be blended is preferably 15 parts by mass or more, more preferably 20 parts by mass or more, and still more preferably 25 parts by mass or more, relative to 100 parts by mass of the rubber component. When the amount of the carbon black is less than 15 parts by mass, rubber reinforcement may be insufficient, and thus it tends to be difficult to assuredly achieve a necessary level of block rigidity, handling stability, partial abrasion resistance, and abrasion resistance. The amount of the carbon black is preferably 70 parts by mass or less, more preferably 60 parts by mass or less, and still more preferably 50 parts by mass or less, relative to 100 parts by mass of the rubber component. When the amount of the carbon black exceeds 70 parts by mass, the processability may deteriorate and the hardness may excessively increase.

The rubber composition of the present invention may contain oils or plasticizers. Examples of the oils or plasticizers include paraffin type process oils, aromatic type process oils, and naphthene type process oils. Concrete examples of the paraffin type process oils include PW-32, PW-90, PW-150 and PS-32, which are manufactured by Idemitsu Kosan Co., Ltd. Concrete examples of the aromatic type process oils include AC-12, AC-460, AH-16, AH-24 and AH-58, which are manufactured by Idemitsu Kosan Co., Ltd.

The amount of the oil or plasticizer to be blended is preferably 2 parts by mass or more, more preferably 5 parts by mass or more, and still more preferably 8 parts by mass or more, relative to 100 parts by mass of the rubber component. When the amount thereof is less than 2 parts by mass, the processability tends to deteriorate. The amount thereof is preferably 40 parts by mass or less, more preferably 30 parts by mass or less, and still more preferably 20 parts by mass or less, relative to 100 parts by mass of the rubber component. When the amount of these ingredients is too high, the abrasion resistance may be reduced and the resistance to reversion may also be reduced. Further, the tan δ at a high temperature may increase, so that the rolling resistance performance may be deteriorated.

Examples of the vulcanization accelerators include N-tert-butyl-2-benzothiazolyl sulfenamide (TBBS), N-cyclohexyl-2-benzothiazolyl sulfenamide (CBS), N,N'-dicyclohexyl-2-benzothiazolyl sulfenamide (DZ), mercaptobenzothiazol (MBT), dibenzothiazolyl disulfide (MBTS), and diphenylguanidine (DPG). TBBS is preferably used among the examples. When TBBS, which is a delayed-type vulcanization accelerator, is used, burning does not easily occur in the production process and excellent vulcanization can be achieved. Further, with regard to the physical properties of the rubber composition after vulcanization, TBBS is excellent in achieving low heat build-up under deformation by external force and greatly improves the performances such as durability.

The rubber composition of the present invention can be produced by a usual method. That is, for example, the aforementioned ingredients are kneaded with a Banbury mixer, a kneader, or an open roll mill, and then vulcanized to produce the rubber composition.

The rubber composition for a base tread of the present invention is applicable to a base tread of a tread that has a two-layer structure including a cap tread and the base tread.

The tire of the present invention can be produced by a usual method using the aforementioned rubber composition. More specifically, the rubber composition for a base tread prepared by blending the aforementioned ingredients is extruded and processed into a base tread shape at an unvulcanized stage, and then assembled with other tire components and molded in a usual manner on a tire building machine to obtain an unvulcanized tire. Then, the unvulcanized tire is subjected to heating and pressing in a vulcanizer to obtain the tire of the present invention.

The tire produced using the rubber composition for a base tread of the present invention is suitably used for passenger vehicles, light trucks (e.g. SUV, van), trucks and buses.

EXAMPLES

The present invention will be specifically described according to examples, and is not intended to be limited only by these examples.

The respective chemical agents used in Examples and Comparative Examples are listed below.

NR: RSS#3
BR: BR150B, produced by Ube Industries, Ltd.
Carbon Black: N330 ($N_2SA$: 88 $m^2/g$, average particle size: 31 nm, DBP oil absorption: 105 ml/100 g), produced by Showa Cabot K. K.
Oil: process oil PW-32, produced by Idemitsu Kosan Co., Ltd.
Wax: SUNNOC Wax, produced by Ouchi Shinko Chemical Industrial Co., Ltd.

Age resistor: NOCRAC 6C (N-(1,3-dimethylbutyl)-N'-phenyl-p-phenylenediamine), produced by Ouchi Shinko Chemical Industrial Co., Ltd.

Stearic Acid: stearic acid, produced by NOF Corp.

Mixture (mixture of zinc salt of aliphatic carboxylic acid and zinc salt of aromatic carboxylic acid): Activator 73A, produced by Struktol, ((i) zinc salt of aliphatic carboxylic acid: zinc salt of coconut oil-derived fatty acid ($C_{8-12}$), (ii) zinc salt of aromatic carboxylic acid: zinc benzoate; molar content ratio: 1/1; zinc content: 17% by mass)

Zinc oxide: Zinc white #1, produced by Mitsui Mining & Smelting Co., Ltd.

Sulfur: sulfur powder, produced by Tsurumi Chemical Co., Ltd.

Vulcanization accelerator TBBS: Nocceler NS (N-t-butyl-2-benzothiazyl sulfenamide), produced by Ouchi Shinko Chemical Industrial Co., Ltd.

Examples 1 to 3 and Comparative Examples 1 to 4

According to the respective formulations shown in Table 1, the ingredients other than sulfur and the vulcanization accelerator were kneaded for five minutes at a temperature of 150° C. using a 1.7 L-Banbury mixer to provide a kneaded product. To the resulting kneaded product were added sulfur and the vulcanization accelerator, and then kneaded with an open two-roll mill for five minutes at a temperature of 80° C., so that an unvulcanized rubber composition was produced.

The thus obtained unvulcanized rubber composition was molded into a base tread shape. The molded product was assembled with other tire components and vulcanized under the vulcanization condition shown in Table 1, so that a test tire was produced.

The thus obtained unvulcanized rubber compositions and test tires (vulcanized rubber compositions) were evaluated as follow. Table 1 shows the results.

(Reversion Rate)

The vulcanization curve of each of the unvulcanized rubber compositions at a temperature of 170° C. was obtained using a curastometer. The maximum torque rise (MH−ML) was regarded as 100, and the torque rise after 15 minutes from the start of vulcanization (M(15 min.)−ML) was expressed by a relative value. The reversion rate was determined by subtraction of the relative value from 100. The lower reversion rate means the better suppression of reversion, that is, the better performance.

(Tensile Test)

The base tread of each of the test tires produced in Examples and Comparative Examples was cut out, and the breaking strength (tensile strength) and breaking elongation (elongation at break) of the cut-out base tread were measured in accordance with JIS K6251-1993. The results were expressed as index values determined by the following equation when the index value of Comparative Example 1 was regarded as 100. The larger index means the better performance.

(Index of tensile strength or elongation)=(Tensile strength or elongation of each composition)/ (Tensile strength or elongation of Comparative Example 1)×100

(Rolling Resistance Performance)

A sample was cut out from the base tread of each of the test tires produced in Examples and Comparative Examples. The tan δ of the samples from the respective compositions was measured using a viscoelasticity spectrometer VES (produced by Iwamoto Seisakusyo Co., Ltd.) under conditions of: a temperature of 70° C.; 10% in initial strain; and 2% in dynamic strain. The results were expressed as index values determined by the following equation when the tan δ of Comparative Example 1 was regarded as 100. The larger index means the better rolling resistance performance.

(Rolling resistance performance index)=(Tan δ of Comparative Example 1)/(Tan δ of each composition)×100

(Viscosity•Processability)

The Mooney viscosity of the respective unvulcanized rubber compositions was measured in accordance with JIS K 6300-1 "Rubber, unvulcanized—Physical property—Part 1: Determination of Mooney viscosity and pre-vulcanization characteristics with Mooney viscometer". That is, a Mooney viscosity tester was preheated for one minute up to 130° C. and a small rotor was rotated under this temperature condition. After four minutes of rotation, the Mooney viscosity ($ML_{1+4}$/130° C.) was determined. Here, the values thus obtained were rounded to the nearest whole number. The processability of each of the compositions was evaluated as follow, based on the Mooney viscosity. A Mooney viscosity value of 30 or more and less than 50 was evaluated as "good", and that of less than 30 and that of 50 or more were evaluated as "poor".

TABLE 1

Rubber Compositions for Base Tread

| | | Examples | | | Comparative Examples | | | |
|---|---|---|---|---|---|---|---|---|
| | | 1 | 2 | 3 | 1 | 2 | 3 | 4 |
| Formulation (part(s) by mass) | NR | 70 | 70 | 70 | 70 | 70 | 70 | 95 |
| | BR | 30 | 30 | 30 | 30 | 30 | 30 | 5 |
| | Carbon Black | 40 | 40 | 40 | 40 | 40 | 40 | 40 |
| | Oil | 7 | 7 | 7 | 7 | 7 | 7 | 7 |
| | Wax | 2 | 2 | 2 | 2 | 2 | 2 | 2 |
| | Age Resistor | 2 | 2 | 2 | 2 | 2 | 2 | 2 |
| | Stearic Acid | — | — | — | 2 | 2 | — | — |
| | Mixture | 1 | 3 | 3 | — | — | 15 | 3 |
| | Zinc Oxide | 3 | 3 | 3 | 3 | 4 | 3 | 3 |
| | Sulfur | 2 | 2 | 2 | 2 | 2 | 2 | 2 |
| | Vulcanization accelerator TBBS | 1 | 1 | 1 | 1 | 1 | 1 | 1 |

TABLE 1-continued

Rubber Compositions for Base Tread

|  | Examples | | | Comparative Examples | | | |
| --- | --- | --- | --- | --- | --- | --- | --- |
|  | 1 | 2 | 3 | 1 | 2 | 3 | 4 |
| Vulcanization Condition | 170° C., 15 min. | 170° C., 15 min. | 180° C., 12 min. | 170° C., 15 min. | 180° C., 12 min. | 170° C., 15 min. | 180° C., 12 min. |
| Reversion Rate | 10 | 0 | 0 | 20 | 30 | 5 | 10 |
| Breaking Strength (Mpa) | 102 | 107 | 107 | 100 | 90 | 105 | 85 |
| Breaking Elongation (%) | 103 | 110 | 110 | 100 | 90 | 105 | 110 |
| Rolling Resistance Performance Index | 102 | 105 | 105 | 100 | 94 | 105 | 100 |
| Viscosity Processability | good | good | good | good | good | poor | poor |

Table 1 shows that, in Examples in which the mixture of a zinc salt of an aliphatic carboxylic acid and a zinc salt of an aromatic carboxylic acid was used, reversion was suppressed, and also good breaking strength and good breaking elongation were achieved. Further, good rolling resistance performance (good fuel economy) was achieved while maintaining sufficient mechanical strength (breaking strength, breaking elongation) Moreover, the processability of the unvulcanized rubber composition was excellent. In contrast, the rubber composition of Comparative Example 1, in which the mixture according to the present invention was not blended, was inferior in terms of such properties as resistance to reversion, breaking strength, breaking elongation, and rolling resistance performance. On the other hand, in Comparative Example 3 in which a large amount of the mixture was blended, the aforementioned properties were maintained, but the processability was deteriorated.

The invention claimed is:

1. A tire comprising a base tread that is produced using a rubber composition for a base tread, comprising:
   a rubber component;
   a carbon black having an average particle size of 35 nm or less and/or a DBP oil absorption of 70 ml/100 g or more; and
   a mixture of a zinc salt of an aliphatic carboxylic acid and a zinc salt of an aromatic carboxylic acid,
   wherein the rubber component comprises natural rubber and butadiene rubber, the natural rubber content being 10 to 90% by mass and the butadiene rubber content being 10 to 90% by mass relative to 100% by mass of the rubber component, and
   the mixture of a zinc salt of an aliphatic carboxylic acid and a zinc salt of an aromatic carboxylic acid is contained in an amount of 1 to 10 parts by mass relative to 100 parts by mass of the rubber component.

2. A tire comprising a base tread according to claim 1, wherein the total content of the natural rubber and the butadiene rubber in 100% by mass of the rubber component is 70% by mass or more.

3. A tire comprising a base tread according to claim 1, wherein the average particle size of the carbon black is 10 to 35 nm, and the DBP oil absorption of the carbon black is 70 to 150 ml/100 g.

4. A tire comprising a base tread according to claim 1, wherein an amount of carbon black in the rubber composition is 15 to 70 parts by mass or more relative to 100 parts by mass of the rubber component.

5. A tire comprising a base tread according to claim 1, wherein the rubber composition comprises an oil or a plasticizer of 5 to 40 parts by mass relative to 100 parts by mass of the rubber component.

* * * * *